United States Patent [19]

Takata et al.

[11] Patent Number: 4,486,030
[45] Date of Patent: Dec. 4, 1984

[54] REAR SUSPENSION APPARATUS FOR MOTOR VEHICLE

[75] Inventors: Naoto Takata; Seita Kanai, both of Hiroshima, Japan

[73] Assignee: Mazda Motor Corporation, Hiroshima, Japan

[21] Appl. No.: 447,934

[22] Filed: Dec. 8, 1982

[30] Foreign Application Priority Data

Dec. 14, 1981 [JP] Japan .................. 56-186977[U]

[51] Int. Cl.³ .............................................. B60G 21/04
[52] U.S. Cl. ...................................... 280/689; 280/723
[58] Field of Search ............ 280/689, 700, 701, 721, 280/723, 664, 665, 725, 726

[56] References Cited

U.S. PATENT DOCUMENTS 3,767,224 10/1973 Schneeweiss ..................... 280/723
4,232,881 11/1980 Kölbel et al. ..................... 280/721

FOREIGN PATENT DOCUMENTS 1240749 5/1967 Fed. Rep. of Germany ...... 280/700
2425740 12/1975 Fed. Rep. of Germany ...... 280/721

Primary Examiner—Joseph F. Peters, Jr.
Assistant Examiner—Ross Weaver
Attorney, Agent, or Firm—Burns, Doane, Swecker and Mathis

[57] ABSTRACT

A suspension apparatus for rear wheels of a motor vehicle, including a pair of trailing arms and a torsion beam of substantially U-shaped cross section. In the apparatus, an opening portion of the torsion beam is oriented forwardly or backwardly in a longitudinal direction of a body of the motor vehicle such that a length of a lower horizontal portion of the torsion beam, measured in the longitudinal direction of the body is made larger than that of an upper horizontal portion of the torsion beam.

4 Claims, 2 Drawing Figures

REAR SUSPENSION APPARATUS FOR MOTOR VEHICLE

BACKGROUND OF THE INVENTION

The present invention generally relates to a motor vehicle and more particularly, to a suspension apparatus for rear wheels of the motor vehicle.

Conventionally, in rear suspension apparatuses for motor vehicles, it has been so arranged that a pair of trailing arms are provided at opposite sides of a body of the motor vehicle so as to extend in a longitudinal direction of the body such that a forward end of each of the trailing arms is pivotally supported by the body and a backward end of each of the trailing arms secures the rear wheels rotatably. However, the prior art rear suspension apparatuses have such an inconvenience that the trailing arms have a low transverse rigidity. Furthermore, there have been proposed an axle type suspension apparatus in which backward ends of opposite trailing arms are coupled with each other by a beam so as to enhance its transverse rigidity and an arrangement in which central portions of opposite trailing arms are coupled with each other by a torsion beam such that variations of camber with respect to the body are maintained at the same level as those of independent suspension apparatuses of semi-trailing arm type so as to obtain advantages of both the axle type and the semi-trailing arm type as disclosed, for example, in U.S. Pat. No. 4,165,099. However, in the latter arrangement, adequate consideration is not given to influences upon the torsion beam and upon coupling portions between the torsion beam and the trailing arms exerted at the time of application of vertical loads to the rear wheels. Namely, in the latter arrangement, when a vertical load is applied to the rear wheels, the torsion beam is subjected to bending deformation such that compressive stress and tensile stress are, respectively, applied to an upper face and a lower face thereof, so that the lower face is fatigued more than the upper face and thus, such undesirable phenomena may readily take place that the torsion beam is ruptured rapidly and coupling portions between the lower face of torsion beam and the trailing arms are ruptured due to a tensile force applied to the coupling portions.

SUMMARY OF THE INVENTION

Accordingly, an essential object of the present invention is to provide an improved rear suspension apparatus in which a lower face of a torsion beam has a large strength against vertical loads so as to enhance its durability, with substantial elimination of the disadvantages inherent in conventional rear suspension apparatuses of this kind.

Another important object of the present invention is to provide an improved rear suspension apparatus of the above described type which is simple in structure, highly reliable in actual use, suitable for mass production at low cost and can be readily incorporated into motor vehicles and the like at low cost.

In accomplishing these and other objects according to one preferred embodiment of the present invention, there is provided an improved suspension apparatus for rear wheels of a motor vehicle, comprising: a pair of first and second trailing arms which are provided at opposite transversal sides of a body of said motor vehicle so as to extend in a longitudinal direction of said body; said first and said second trailing arms being pivotally supported at forward ends of said first and said second trailing arms, respectively by said body so as to be pivoted in a vertical direction of said body while said rear wheels are rotatably secured to backward ends of said first and said second trailing arms, respectively; and a torsion beam of substantially U-shaped cross section having a first side portion, a second side portion and a base portion, which is secured to and extends transversely between said first and said second trailing arms so as to be positioned intermediate the forward end and the backward end of each of said first and said second trailing arms such that an opening portion of said torsion beam is oriented forwardly or backwardly in the longitudinal direction of said body; said first side portion extending in a horizontal direction of said body being disposed below said second side portion extending in the horizontal direction of said body, with said base portion extending substantially in the vertical direction of said body; said first side portion and said second side portion having a first width and a second width in the longitudinal direction of said body, respectively such that said first length of said first side portion disposed below said second side portion is made larger than said second length of said second side portion.

In accordance with the present invention, since the lower horizontal portion of the torsion beam, subjected to a large tensile force at the time of application of the vertical load to the rear wheels is increased in strength, durability of the rear suspension apparatus has been enhanced.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
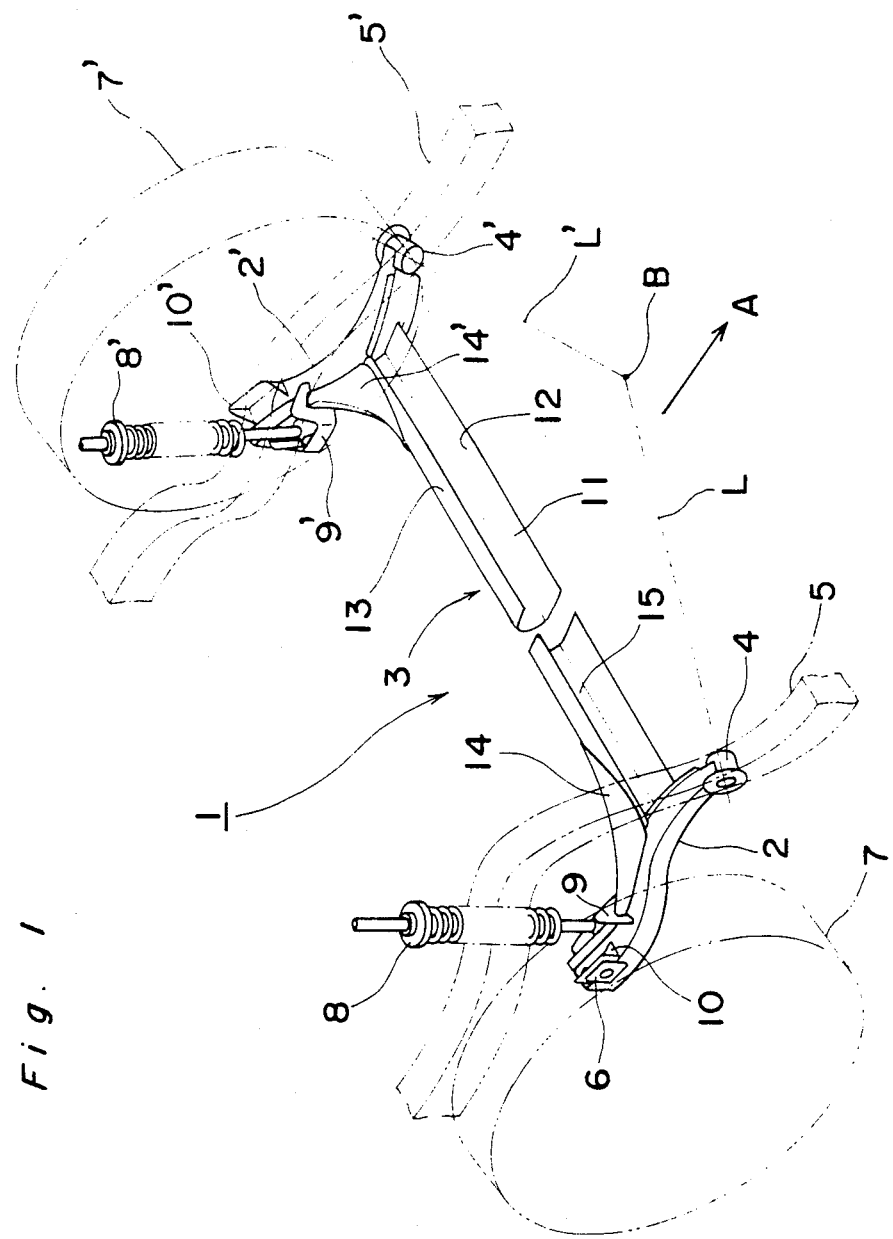
FIG. 1 is a perspective view of a rear suspension apparatus for motor vehicle, according to the present invention.
Figure 2:
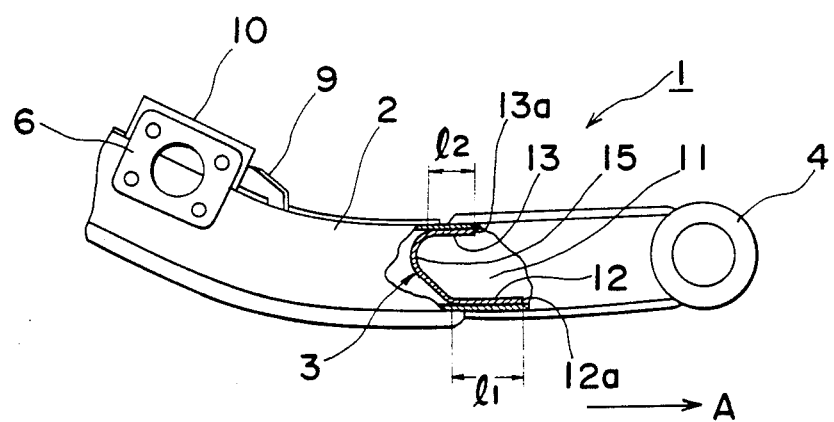
FIG. 2 is a side elevational, partially sectional view of a main part of the rear suspension apparatus of FIG. 1.

Referring now to the drawings, there is shown in FIGS. 1 and 2, a rear suspension apparatus 1 for a motor vehicle, according to one preferred embodiment of the present invention. The rear suspension apparatus 1 includes a pair of trailing arms 2 and 2', a torsion beam 3 of substantially U-shaped cross section, a pair of bushings 4 and 4', a pair of supporting plates 6 and 6' (not shown), a pair of dampers 8 and 8', a pair of brackets 9 and 9', a pair of reinforcing plates 10 and 10', and a pair of gusset plates 14 and 14'. The trailing arms 2 and 2', bushings 4 and 4', supporting plates 6 and 6', dampers 8 and 8', brackets 9 and 9', reinforcing plates 10 and 10', and gusset plates 14 and 14' are, respectively, disposed at a side frame 5 for a rear wheel 7 and at a side frame 5' for a rear wheel 7'. It should be noted here that, since the rear suspension apparatus 1 is symmetrical with respect to a longitudinal center line of a body of the motor vehicle, only one side of the rear suspension apparatus 1 will be mainly described for brevity, hereinbelow. It is to be further noted that the motor vehicle is arranged to run forwardly in the direction of the arrow A in FIGS. 1 and 2. The trailing arms 2 and 2' are provided at opposite transversal sides of the body so as to extend in the longitudinal direction of the body and are coupled with each other by the torsion beam 3 extending in a sidewise direction of the body. The bushing 4 is secured to a forward end of the trailing arm 2 such that an axis L of the bushing 4 extends in a horizontal direction of the body. The bushing 4 is further supported by the side frame 5 of the body through a rubber bushing and a pin such that the trailing arm 2 is pivoted about the axis L of the bushing 4 in a vertical direction of the body. The bushings 4 and 4' are inclined with respect to the torsion beam 3 in a horizontal plane of the body so as to extend into the body in directions remote from the torsion beam 3, respectively, whereby the axis L of the bushing 4 intersects with an axis L' of the bushing 4' at a point B disposed forwardly of a line connecting the bushing 4 and the bushing 4' in parallel with the torsion beam 3 as shown in FIG. 1.

The supporting plate 6 is secured to an outer side of a backward end of the trailing arm 2 and the rear wheel 7 is, in turn, rotatably supported by the supporting plate 6 through a wheel spindle. Meanwhile, the bracket 9 for supporting the damper 8 is attached to an inner side of the backward end of the trailing arm 2. Furthermore, the reinforcing plate 10 for reinforcing the supporting plate 6 is provided so as to couple an upper face of the trailing arm 2 with an upper end portion of the supporting plate 6.

The torsion beam 3 has a substantially U-shaped cross section and opposite ends of the torsion beam 3 are welded to opposite inner side faces of the trailing arms 2 and 2', respectively such that an opening portion 11 of the torsion beam 3 is oriented forwardly in the longitudinal direction of the body, i.e. in the direction of the arrow A, whereby the torsion beam 3 has a lower horizontal portion 12 and an upper horizontal portion 13, both extending in a horizontal direction of the body, and a base portion 15 extending substantially in the vertical direction of the body. A length l1 of the lower horizontal portion 12, measured in the longitudinal direction of the body is made larger than a length l2 of the upper horizontal portion 13, measured in the longitudinal direction of the body. Meanwhile, a bending vertex of the base portion 15 of the torsion beam 3 is disposed above a central position between the lower horizontal portion 12 and the upper horizontal portion 13 in the vertical direction of the body as shown in FIG. 2.

Furthermore, it can be understood from FIG. 2 that a forward end 12a of the lower horizontal portion 12 is disposed forwardly of a forward end 13a of the upper horizontal portion 13 in the longitudinal direction of the body. The gusset plate 14 having a substantially triangular shape is secured to top faces of the trailing arm 2 and the torsion beam 3 so as to be disposed at a corner formed therebetween backwardly of the torsion beam 3. Meanwhile, it can be also so arranged that a stabilizer is additionally provided inside the torsion beam 3.

In the above described arrangement of the rear suspension apparatus 1 of the present invention, when an upward load resulting from bumps on a road surface, etc. is applied to either one of the rear wheels 7 and 7', the upper horizontal portion 13 and the lower horizontal portion 12 of the torsion beam 3 connecting the trailing arms 2 and 2' are, respectively, subjected to compressive stress and tensile stress. However, since it is so arranged that the length l1 of the lower horizontal portion 12 subjected to the tensile stress is made larger than the length l2 of the upper horizontal portion 13, strength of the lower horizontal portion 12 is enhanced, so that strength of the lower horizontal portion 12 against the above-mentioned upward load is increased and at the same time, rupture of the coupling portions between the torsion beam 3 and the trailing arms 2 and 2' is prevented.

Meanwhile, since strength of the lower horizontal portion 12 of the torsion beam 3 is enhanced as described above, gusset plates for coupling the torsion beam 3 with the trailing arms 2 and 2' are not required to be provided at both a forward side and a backward side of the torsion beam 3 but the gusset plates 14 and 14' are required to be provided only at the backward side of the torsion beam 3 in this embodiment, so that the gusset plates required to be provided are reduced in number.

Meanwhile, although the torsion beam 3 is coupled with the trailing arms 2 and 2' by welding in this embodiment, it can be also so arranged that the torsion beam 3 and the trailing arms 2 and 2' are subjected to monolithic molding by the use of plastic material. Furthermore, it can be so arranged that the opening portion 11 of the torsion beam 3 is oriented backwardly in the longitudinal direction of the body.

As is clear from the foregoing description, in accordance with the present invention, since the length of the lower horizontal portion of the torsion beam, measured in the longitudinal direction of the body is made larger than that of the upper horizontal portion of the torsion beam, strength of the lower horizontal portion subjected to tensile stress at the time of application of the vertical load to the rear wheels is enhanced, so that durability of the torsion beam and the coupling portions between the torsion beam and the trailing arms is improved remarkably.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A suspension apparatus for rear wheels of a motor vehicle, comprising:

a pair of first and second trailing arms which are provided at opposite transversal sides of a body of said motor vehicle so as to extend in a longitudinal direction of said body;

said first and said second trailing arms being pivotally supported at forward ends of said first and said second trailing arms, respectively by said body so as to be pivoted in a vertical direction of said body while said rear wheels are rotatably secured to backward ends of said first and said second trailing arms, respectively; and a torsion beam of substantially U-shaped cross section having a first side portion, a second side portion and a base portion, which is secured to and extends transversely between said first and said second trailing arms so as to be positioned intermediate the forward end and the backward end of each of said first and said second trailing arms such that an opening portion of said torsion beam is oriented forwardly or backwardly in the longitudinal direction of said body;

said first side portion extending in a horizontal direction of said body being disposed below said second side portion extending in the horizontal direction of said body, with said base portion extending substantially in the vertical direction of said body;

said first side portion and said second side portion having a first width and a second width in the longitudinal direction of said body, respectively such that said first width of said first side portion disposed below said second side portion is made larger than said second width of said second side portion.

2. A suspension apparatus as claimed in claim 1, wherein said opening portion of said torsion beam is oriented forwardly in the longitudinal direction of said body such that a forward end of said first side portion disposed below said second side portion is located forwardly of a forward end of said second side portion in the longitudinal direction of said body.

3. A suspension apparatus as claimed in claim 1, wherein a bending vertex of said base portion of said torsion beam is disposed above a central position between said first side portion and said second side portion in the vertical direction of said body.

4. A suspension apparatus as claimed in claim 1, further including a pair of first and second rubber bushings which are, respectively, provided at the forward ends of said first and said second trailing arms so as to have a first pivotal axis for said first trailing arm and a second pivotal axis for said second trailing arm, respectively, said first pivotal axis and said second pivotal axis being positioned in a horizontal plane of said body and being inclined with respect to said torsion beam in the horizontal plane of said body so as to extend into said body in directions remote from said torsion beam, respectively such that said first pivotal axis intersects with said second pivotal axis at a point disposed forwardly of a line connecting said first rubber bushing and said second rubber bushing in parallel with said torsion beam.

* * * * *